(12) United States Patent
Ran et al.

(10) Patent No.: US 12,482,434 B2
(45) Date of Patent: Nov. 25, 2025

(54) BACKLIGHT MODULE, DRIVING METHOD THEREOF AND DISPLAY DEVICE

(71) Applicant: HKC CORPORATION LIMITED, Shenzhen (CN)

(72) Inventors: Ruidi Ran, Shenzhen (CN); Luhong Zhou, Shenzhen (CN); Junfeng Xie, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/759,996

(22) Filed: Jun. 30, 2024

(65) Prior Publication Data

US 2025/0006143 A1   Jan. 2, 2025

(30) Foreign Application Priority Data

Jun. 30, 2023  (CN) .......................... 202310809186.4

(51) Int. Cl.
  *G09G 3/34*  (2006.01)
  *G09G 3/36*  (2006.01)

(52) U.S. Cl.
  CPC ... *G09G 3/3426* (2013.01); *G09G 2320/0626* (2013.01); *G09G 2320/0693* (2013.01); *G09G 2340/16* (2013.01)

(58) Field of Classification Search
  CPC .. G09G 3/20; G09G 3/32; G09G 3/34; G09G 3/36; G09G 3/325; G09G 3/3225;
  (Continued)

(56) References Cited

U.S. PATENT DOCUMENTS

| | | | |
|---|---|---|---|
| 2008/0174544 A1* | 7/2008 | Ueda ................... | G09G 3/3426 315/324 |
| 2015/0145434 A1* | 5/2015 | Jang .................... | H05B 45/395 315/294 |

(Continued)

FOREIGN PATENT DOCUMENTS

| | | |
|---|---|---|
| CN | 108877688 A | 11/2018 |
| CN | 109346016 A | 2/2019 |

(Continued)

*Primary Examiner* — Chanh D Nguyen
*Assistant Examiner* — Nguyen H Truong
(74) *Attorney, Agent, or Firm* — Franklin & Associates International Inc; Matthew F. Lambrinos

(57) ABSTRACT

Disclosed are a backlight module, a driving method thereof, and a display device. The method includes: in a first period t1, outputting an initial current by a driver chip to a light-emitting unit in a light-emitting area; obtaining a difference between the initial current and an actual current; generating a second current according to the difference between the initial current and the actual current; in a second period t2, outputting a second current by the driver chip to the light-emitting unit in the light-emitting area; and detecting the actual brightness of the light-emitting area, and determining a difference between the actual brightness and target brightness of the light-emitting area; generating a third current according to the difference between the actual brightness and the target brightness; and in a third period t3, outputting the third current by the driver chip to the light-emitting unit in the light-emitting area.

16 Claims, 5 Drawing Sheets

(58) Field of Classification Search
CPC ............... G09G 3/3233; G09G 3/3426; G09G 2320/0626; G09G 2320/0693; G09G 2340/16; H10K 10/00; H10K 19/00; H10K 59/32; H05B 33/08; H05B 37/02; H05B 45/14; H05B 45/38; H05B 45/40; H05B 45/325

See application file for complete search history.

(56) References Cited

U.S. PATENT DOCUMENTS

| | | | |
|---|---|---|---|
| 2019/0287466 A1 | 9/2019 | Yin et al. | |
| 2021/0166638 A1 | 6/2021 | Yan et al. | |
| 2021/0398479 A1* | 12/2021 | Kim | G09G 3/2014 |
| 2023/0122765 A1* | 4/2023 | Fu | G09G 3/3233 |
| | | | 345/207 |
| 2023/0269845 A1* | 8/2023 | Chou | H05B 45/54 |
| | | | 315/294 |
| 2024/0272481 A1* | 8/2024 | Sun | H05B 47/16 |

FOREIGN PATENT DOCUMENTS

| | | |
|---|---|---|
| CN | 111341275 A | 6/2020 |
| CN | 111899694 A | 11/2020 |
| CN | 114613337 A | 6/2022 |
| CN | 115223509 A | 10/2022 |
| KR | 20100012965 A | 2/2010 |

\* cited by examiner

| A1 | A2 | A3 | A4 | A5 | A6 |
| --- | --- | --- | --- | --- | --- |
| A7 | A8 | A9 | A10 | A11 | A12 |
| A13 | A14 | A15 | A16 | A17 | A18 |

BACKLIGHT MODULE, DRIVING METHOD THEREOF AND DISPLAY DEVICE

CROSS REFERENCE OF RELATED APPLICATION

This disclosure claims the priority of Chinese patent disclosure No. 202310809186.4 filed on Jun. 30, 2023 with the Patent Office of the State Intellectual Property Office of the People's Republic of China, titled a backlight module, a driving method thereof, and a display device, incorporated herein by reference.

FIELD

The present disclosure relates to the field of display technology, in particular to a backlight module, a driving method thereof, and a display device.

BACKGROUND

A backlight module is configured to provide backlight for a liquid crystal display panel. The conventional backlight module continues emitting light when providing backlight for the liquid crystal display panel even when an image displayed by the liquid crystal display panel is completely or mostly black, which results in large overall power consumption of the product.

In response to this situation, an improved backlight module has appeared in the related art, which has a partition function. The backlight module comprises a plurality of independent light-emitting areas, each of which can emit light independently. In this way, when most of the images displayed on the liquid crystal display panel are black, the light-emitting areas corresponding to the black images do not need to emit light; and the images displayed on the liquid crystal display panel can be divided into high-brightness areas and low-brightness areas. In the light-emitting area corresponding to the high-brightness area, the LED and other light-emitting devices can be controlled to emit high-brightness light, while in the light-emitting area corresponding to the low-brightness area, the LED and other light-emitting devices can be controlled to emit low-brightness light, which can reduce energy consumption of the backlight module, thereby reducing the overall power consumption of the display device.

However, the above backlight module has some technical problems. For example, when light-emitting devices such as LED are controlled to emit light with a predetermined brightness, due to various reasons such as loss of a current signal output by a driver chip during a transmission process and errors in a preparation process of the light-emitting device, the light actually emitted by each light-emitting area cannot reach a predetermined brightness, resulting in a deviation in brightness of the corresponding light-emitting area and ultimately a deviation in brightness of the image actually displayed on the display panel.

SUMMARY

The present disclosure provides a backlight module, a driving method thereof, and a display device.

The present disclosure provides a driving method of a backlight module comprising a plurality of light-emitting areas, each of which is provided with one or more light-emitting units; the driving method of the backlight module comprising:

in a first period t1 when a display device displays a nth frame image, outputting an initial current to the light-emitting unit in the light-emitting area by a driver chip; and obtaining a difference between an actual current and the initial current, and generating a second current to compensate for the light-emitting unit based on the difference between the actual current and the initial current, wherein n is a natural number greater than 0, and the actual current is a current at which the initial current is transmitted to the light-emitting unit;

in a second period t2 when the display device displays the nth frame image, outputting a second current to the light-emitting unit in the light-emitting area by the driver chip, so that the actual current supplied to the light-emitting unit is equal to the initial current;

and detecting actual brightness of the light-emitting area, determining a difference between the actual brightness and target brightness of the light-emitting area, and generating a third current to compensate for the light-emitting unit in the light-emitting area based on the difference between the actual brightness and the target brightness, wherein the target brightness is brightness that the light-emitting area reaches at the initial current; and in a third period t3 when the display device displays the nth frame image, outputting the third current to the light-emitting unit in the light-emitting area by the driver chip, so that the actual brightness of the light-emitting area is equal to the target brightness.

Wherein, obtaining a difference between an actual current and the initial current, and generating a second current to compensate for the light-emitting unit based on the difference between the actual current and the initial current comprises:

collecting a current at an output port of the driver chip as the initial current, and collecting a current at an input port of the light emitting unit as the actual current; and subtracting the actual current from the initial current to obtain a first compensation current value and adding the initial current and the first compensation current value to obtain the second current.

Wherein, detecting actual brightness of the light-emitting area, and generating a third current to compensate for the light-emitting unit in the light-emitting area based on the actual brightness and the target brightness comprises:

obtaining the actual brightness of the light-emitting area;

Obtaining an actual brightness current value corresponding to the actual brightness according to a brightness-current curve;

Obtaining an initial current value corresponding to the target brightness;

subtracting the actual brightness current value from the initial current value to obtain a second compensation current value; and adding the second current and the second compensation current value to obtain the third current.

Wherein, the driving method of the backlight module further comprises:

Obtaining a (n+1)th frame image to be displayed when the nth frame image is displayed;

Obtaining an area image corresponding to the light-emitting area in the (n+1)th frame image to be displayed;

Comparing actual brightness of the light-emitting area when the nth frame image is displayed with brightness of the light-emitting area when the (n+1)th frame image is displayed, if a difference therebetween is less than a set value, controlling the actual brightness of the light-emitting area when the (n+1)th frame image is displayed to be the same as the actual brightness of the light-emitting area when the nth frame image is displayed; and Repeating the above steps until a difference between actual brightness of the light-emitting area when a previous frame image is displayed and brightness of the light-emitting area when a subsequent frame image is displayed is greater than a set value in two adjacent frames of images.

Wherein, detecting actual brightness of the light-emitting area, and generating a third current to compensate for the light-emitting unit in the light-emitting area based on the actual brightness and the target brightness comprises:

Obtaining the actual brightness of the light-emitting area, when the difference between the actual brightness and the target brightness is greater than a set value, establishing a corresponding functional relationship or a corresponding coordinate system between the actual brightness of the light-emitting area and a current corresponding thereto according to the actual brightness of the light-emitting area and the corresponding current in an image being currently displayed and m frames of images to be displayed thereafter;

searching a corresponding current value according to the target brightness in the established corresponding functional relationship or corresponding coordinate system when an image after the m frames of images is displayed in the second period t2, wherein m is a natural number greater than 0;

outputting the third current to the light-emitting unit in the light-emitting area by the driver chip in the third period t3, the output third current being equal to the searched current value.

Wherein, establishing a corresponding functional relationship or a corresponding coordinate system between the actual brightness of the light-emitting area and a current corresponding thereto comprises:

in the third period t3 of the image currently being displayed and the m frames of images to be displayed thereafter, the third current output by the driver chip to the light-emitting unit in the light-emitting area is equal to the second current.

Wherein, establishing a corresponding functional relationship or a corresponding coordinate system between the actual brightness of the light-emitting area and a current corresponding thereto comprises:

the third current has a current value greater than that of the second current determined according to set rule.

Wherein, the actual brightness of the light-emitting area and the current configured to establish the corresponding functional relationship or the corresponding coordinate system comprise:

The actual brightness of the light-emitting area and the corresponding second current in the second period t2 of an image currently being displayed and the m frames of images to be displayed thereafter, and the actual brightness of the light-emitting area and the corresponding third current in the third period t3 of the image currently being displayed and the m frames of images to be displayed thereafter.

A backlight module provided by the present disclosure comprises a plurality of independent light-emitting areas, each of which is provided with at least one light-emitting unit corresponding thereto; a current sampling module; a brightness detection module; a driver chip; and a controller, wherein The driver chip is configured to output an initial current, a second current and a third current to each of the light emitting units respectively in a first period t1, a second period t2 and a third period t3 when each frame of image is displayed;

The current sampling module is arranged between the driver chip and each of the light emitting units, and is configured to collect the initial current and an actual current when the driver chip outputs the initial current to each of the light emitting units, the initial current being a current output by the driver chip, the actual current being a current actually supplied to the light-emitting unit;

The brightness detection module is configured to detect actual brightness of the light-emitting area;

The controller is configured to determine a value of the second current to each of the light emitting units based on the initial current and the actual current; and to generate the third current to the light emitting unit in the light-emitting area according to the actual brightness and target brightness of each of the light-emitting areas in the second period t2, wherein the target brightness is brightness that each of the light-emitting areas should reach at the initial current.

Wherein, the light-emitting detection module comprises a photoresistor arranged in each of the light-emitting areas.

Wherein, each of the light-emitting areas is provided with a plurality of photoresistors arranged at intervals within the light-emitting area.

Wherein, a plurality of the light-emitting areas are divided into a plurality of rows and/or a plurality of columns; a shape of a plurality of the light-emitting areas comprise one or more of polygons, circles and ellipses.

Wherein, the backlight module further comprises a light guide plate, a quantum dot layer, a reflective layer, a first shading part and a second shading part; wherein The light emitting unit is configured to emit light to a direction of the light guide plate, and the quantum dot layer is arranged above the light guide plate; the reflective layer is arranged below the light guide plate;

The first shading part is arranged on a peripheral side of the light guide plate, and the second shading part is arranged on a lower side of the reflective layer; the first shading part or the second shading part abuts the light-emitting unit, and heat generated by the light-emitting unit is transferred outward; material of the first shading part and the second shading part is EPP material.

A display device provided by the present disclosure comprises the above-mentioned backlight module and a display panel arranged in a light-exit direction of the backlight module.

Compared with the related art, the backlight module, the driving method thereof, and the display device provided by the present disclosure have the following advantages:

In the backlight module, the driving method thereof, and the display device provided by the present disclosure, during the first period t1 when the nth frame image is displayed, the driver chip outputs an initial current to the light-emitting unit in the light-emitting area, and during the first period t1, a second current is generated according to the initial current and the actual current; then, during the second period t2, the driver chip outputs a second current to the light-emitting unit in the light-emitting area, after loss in the transmission process, the second current can ensure that the actual current supplied to the light-emitting unit is equal to the initial current. Ideally, the light-emitting brightness of the light-emitting units in the light-emitting area at this time should meet the standards and expectations, so that the actual brightness of the light-emitting area can reach the target brightness. However, in practice, due to abnormalities that will inevitably occur in an actual preparation process of the relevant devices in the backlight module, and abnormalities such as possibly damage or low light-emitting brightness of some light-emitting units in the light-emitting area during the working process, even if the actual current supplied to the light-emitting unit is equal to the initial current, the actual brightness of the light-emitting area is still difficult to reach the target brightness in some cases. Therefore, during the second period t2, a third current is generated according to the actual brightness and the target brightness of the light-emitting area. Thereafter, during the third period t3, the driver chip outputs the third current to the light-emitting unit in the light-emitting area. The current difference between the third current and the second current is configured to compensate for the difference between the actual brightness and the target brightness of the light-emitting area, so as to ensure that the actual brightness of the light-emitting area is equal to the target brightness. For example, when the actual brightness of the light-emitting area is less than the target brightness, the third current generated will be greater than the second current, and the brightness difference therebetween will be positive. In this way, during the third period t3, after the third current is supplied to the light-emitting unit, the light-emitting brightness of the light-emitting unit will increase, thereby increasing the actual brightness of the light-emitting area. When the above brightness difference and the third current are reasonably determined, the actual brightness of the light-emitting area is equal to the target brightness. When the actual brightness of the light-emitting area is greater than the target brightness, the generated third current will be lower than the second current, and the brightness difference therebetween will be negative. In this way, during the third period t3, after the third current is supplied to the light-emitting unit, the light-emitting brightness of the light-emitting unit will decrease, thereby decreasing the actual brightness of the light-emitting area. When the above brightness difference and the third current are reasonably determined, the actual brightness of the light-emitting area will be equal to the target brightness. Thus, during the third period t3, it is possible to avoid the situation where the actual brightness of the light-emitting area does not reach the target brightness due to a reasons such as the backlight module itself or loss in the working process, and to improve deviation in the display brightness during display.

BRIEF DESCRIPTION OF THE DRAWINGS

The accompanying drawings, which are incorporated in and constitute a part of the description, illustrate embodiments according to the disclosure and together with the description serve to explain principles of the disclosure.

In order to more clearly illustrate the embodiments of the present disclosure or the technical solutions in the related art, the drawings to be used in the description of the embodiments or the related art will be briefly introduced below. Obviously, for those of ordinary skills in the art, other drawings can be obtained based on these drawings without devoting creative labor.

REFERENCE NUMERALS

10—Light-emitting unit;
11—Current sampling module;
12—Driver chip;
13—Controller;
14—Brightness detection module;
20—Light guide plate;
30—Quantum dot layer;
40—Reflective layer;
51—First shading part;
52—Second shading part.

DETAILED DESCRIPTION

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are some embodiments of the present disclosure, not all embodiments. Based on the embodiments of the present disclosure, all other embodiments obtained by those of ordinary skilled in the art without any creative labor fall within the scope of protection of the present disclosure.

Embodiments of a backlight module, a driving method thereof, and a display device provided by the present disclosure will be described below with reference to the accompanying drawings.

In an embodiment of the backlight module of the present disclosure, a backlight module comprises a plurality of independent light-emitting areas, each of which is provided with at least one light-emitting unit corresponding thereto. One or more light-emitting units 10 corresponding to each light-emitting area may be specifically LED, Mini LED, MICROLED or other types of light-emitting devices. The light-emitting device emits light which is emitted from the corresponding light-emitting area, thereby achieving independent light emitting of each light-emitting area. For example, in the structure shown in FIG. 4, the backlight module comprises 18 light-emitting areas, namely A1 to A18.

Figure 1:
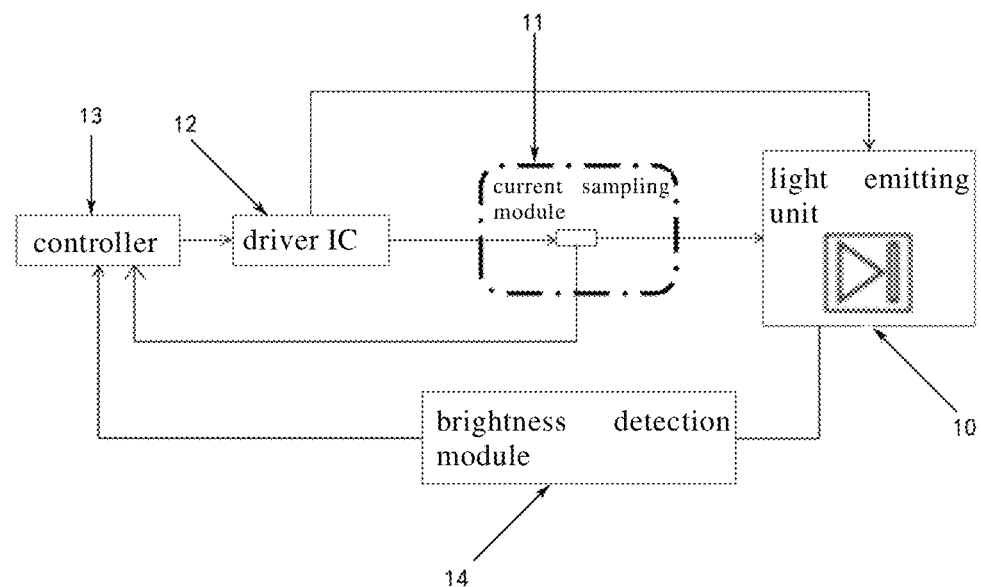
FIG. 1 is a schematic block diagram of a backlight module in an embodiment of the present disclosure.

As shown in FIG. 1, the backlight module further comprises a current sampling module 11, a driver chip 12, a controller 13 and a brightness detection module 14. The driver chip 12 is configured to respectively output an initial current I1, a second current I2 and a third current I3 to each of the light-emitting units 10 during a first period t1, a second period t2 and a third period t3 when each frame of image is displayed. The current sampling module 11 is provided between the driver chip 12 and each of the light-emitting units 10, and is configured to collect an initial current and an actual current when the driver chip 12 outputs the initial current I1 to each of the light-emitting units 10. The initial current is a current output by the driver chip 12, and the actual current is a current actually supplied to the light-emitting unit 10. The brightness detection module 14 is configured to detect actual brightness of the light-emitting area. The controller 13 is configured to determine the second current I2 for each of the light-emitting units 10 according to the initial current and the actual current; as well as, generate the third current I3 for the light-emitting unit 10 in the light-emitting area according to actual brightness and target brightness of each light-emitting area during the second period t2; the target brightness is brightness that each of the light-emitting areas should achieve at the initial current.

During a working process of the backlight module, the driver chip 12 outputs a current signal to the light-emitting unit 10. The light-emitting unit 10 emits light according to the current signal, and the emitted light is emitted into the liquid crystal display panel for display.

In the above process, the current signal output by the driver chip 12 to the light-emitting unit 10 in each light-emitting area is independent, and the current signal output by the driver chip 12 to each of the light-emitting units 10 at different times is variable. That is, the current signals supplied by the driver chip 12 to the light-emitting units 10 in different light-emitting areas are different, and the current signals supplied by the driver chip 12 to the same light-emitting unit 10 at two consecutive time points may also be different. Based on the above different current signals, the light-emitting units 10 in different light-emitting areas can emit light with different brightness. Correspondingly, the different light-emitting areas can have different brightness overall; and the brightness of each light-emitting area may be increased or decreased in the subsequent working process.

In the above process, even if the current signals given to different light-emitting areas are the same, the actual current signals finally received by the light-emitting unit may be different, which ultimately leads to different brightness of the light-emitting areas, such as differences after current transmission caused by differences in a manufacture procedure of different light-emitting areas, or differences after current transmission caused by different aging levels of different light-emitting areas after a certain period of use; that is, actual different product situations lead to differences between brightness and originally preset brightness of the different light-emitting areas, resulting in a poor display effect or uneven brightness.

According to the above, a plurality of the light-emitting areas on the backlight module can correspond to different areas on the image to be displayed by the liquid crystal display panel. When the liquid crystal display panel displays a frame of image, by controlling a magnitude of the current of the light-emitting unit 10 corresponding to each light-emitting area supplied by the driver chip 12, brightness of a plurality of the light-emitting areas can be controlled to match blocks corresponding to a plurality of the light-emitting areas in the frame of image.

For example, in a light-emitting area corresponding to a dark block on the current frame of image, the current supplied by the driver chip 12 to the light-emitting unit 10 is controlled to be low, and the light-emitting area corresponding to the dark block has low brightness. In the light-emitting area corresponding to a bright block on the current frame of image, the current supplied by the driver chip 12 to the light-emitting unit 10 may be large, and the light-emitting area corresponding to the bright block has high brightness. On the other hand, each light-emitting area, when the corresponding block on the current frame of image being displayed by the liquid crystal display panel is a dark block, the driver chip 12 is controlled to supply a small current to the light-emitting unit 10, while the light-emitting area has low brightness; and when the corresponding block on the next frame of image to be displayed by the liquid crystal display panel is a bright block, the driver chip 12 is controlled to supply a larger current to the light-emitting unit 10, so that the light-emitting area has higher brightness when the liquid crystal display panel displays the next frame of image.

However, when the display device displays a segment of images, if brightness of area images corresponding to some or even most of the light-emitting areas is consistent, or even brightness of area images corresponding to all the light-emitting areas is consistent, currents output by the driver chip 12 to these light-emitting areas may be the same. For example, in an initial stage after the display device is turned on, when a product manufacturer's LOGO (sign) is displayed, brightness of other most areas except the LOGO is the same. Regarding the light-emitting areas corresponding to these areas, currents output by the driver chip to the light-emitting units 10 in these light-emitting areas can be the same.

In the backlight module of this embodiment, during the first period t1 when the nth frame image is displayed, the driver chip outputs an initial current to the light-emitting unit in the light-emitting area, and a value of the second current is generated according to the initial current and the actual current during the first period t1. Then, during the second period t2, the driver chip outputs the second current to the light-emitting unit in the light-emitting area. After loss in the transmission process, the second current can ensure that the current value actually supplied to the light-emitting unit is equal to the initial current. Ideally, light-emitting brightness of the light-emitting unit in the light-emitting area at this time should meet the standards and expectations, which can support that the actual brightness of the light-emitting area reaches target brightness. However, in practice, due to abnormalities that will inevitably occur in the actual preparation process of relevant devices in the backlight module and abnormalities such as possibly damage or low light-emitting brightness of some light-emitting units in the light-emitting area during the working process, even if the actual current supplied to the light-emitting unit is equal to the initial current, the actual brightness of the light-emitting area is difficult to reach the target brightness in some cases. Therefore, during the second period t2, a third current is generated according to the actual brightness and the target brightness of the light-emitting area; thereafter, during the third period t3, the driver chip outputs the third current to the light-emitting unit in the light-emitting area. A current difference between the third current and the second current is configured to compensate for a difference between the actual brightness of the light-emitting area and the target brightness, so as to ensure that the actual brightness of the light-emitting area is equal to the target brightness. For example, when the actual brightness of the light-emitting area is less than the target brightness, the third current generated will be greater than the second current, and the brightness difference thereof is positive. Thus, in the third period t3, after the third current is supplied to the light-emitting unit, the light-emitting brightness of the light-emitting unit will increase, thereby increasing the actual brightness of the light-emitting area. When the above brightness difference and the third current are reasonably determined, the actual brightness of the light-emitting area will be equal to the target brightness. When the actual brightness of the light-emitting area is greater than the target brightness, the third current generated will be lower than the second current, and the brightness difference thereof will be negative. Thus, in the third period t3, after the third current is supplied to the light-emitting unit, the light-emitting brightness of the light-emitting unit will decrease, thereby decreasing the actual brightness of the light-emitting area. When the above brightness difference and the third current are reasonably determined, the actual brightness of the light-emitting area will be equal to the target brightness. Thus, in the third period t3, it is possible to avoid a situation where the actual brightness of the light-emitting area does not reach the target brightness due to a reason such as the backlight module's own devices or losses during the working process, and to improve deviation in the display brightness during display.

In an embodiment of the backlight module, the brightness detection module 14 comprises a photoresistor provided in each of the light-emitting areas.

The photoresistor can have different resistance values when brightness of light is different in response to the brightness of light in its environment. Therefore, in this embodiment, the actual light-emitting brightness of the light-emitting area where the photoresistor is located can be determined based on the resistance value of the photoresistor. The photoresistor is electrically connected to a controller, and the controller determines the brightness of the light-emitting area by receiving a signal of the photoresistor. Specifically, the controller can determine the resistance value of the photoresistor based on the received signal. Based on the resistance value, the brightness of the environment where the photoresistor is located can be restored. The restored brightness data can represent the brightness of the light-emitting area, that is, the actual brightness of the light-emitting area can be determined.

In a further embodiment, each of the light-emitting areas is provided with a plurality of photoresistors arranged at intervals in the light-emitting areas, which can sense the brightness of different regions of each light-emitting area, and determine the actual brightness of each light-emitting area more accurately and evenly according to the brightness data obtained in the different regions.

In an embodiment of the backlight module, a plurality of the light-emitting areas include a plurality of rows and/or a plurality of columns. For example, in a structure of the backlight module shown in FIG. 4, 18 light-emitting areas are divided into 3 rows and 6 columns. That is to say, the light-emitting areas are distributed in an array, specifically in a plurality of rows and columns.

In an embodiment of the backlight module, a plurality of the light-emitting areas comprise one or more of polygons, circles, and ellipses. Generally, the backlight module is rectangular. In this case, each light-emitting area may also be provided as a rectangular structure. Small rectangular structures of a plurality of the light-emitting areas are adjacent and pieced together in sequence to form a complete light-emitting area of the backlight module. According to needs of the actual situation, the light-emitting area can also be divided into other shapes such as circles, ellipses and triangles.

Figure 2:
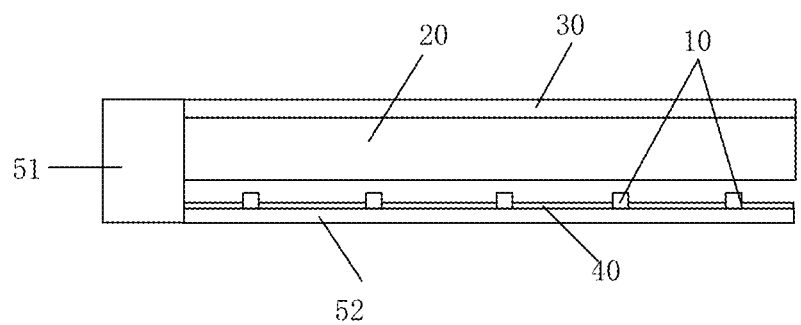
FIG. 2 is a schematic structural diagram of a backlight module in an embodiment of the present disclosure.
Figures 3, 4:
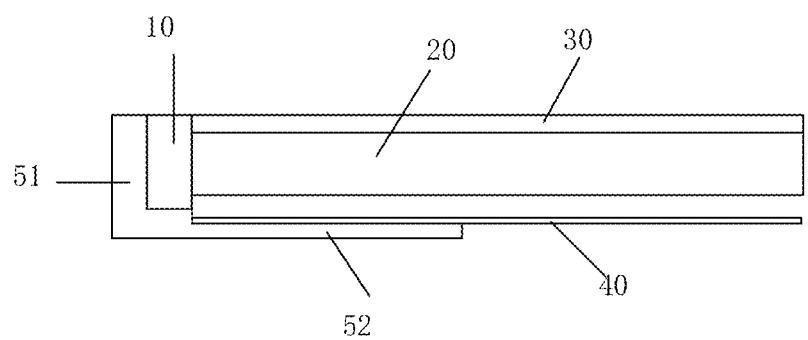
FIG. 3 is a schematic structural diagram of a backlight module in another embodiment of the present disclosure.
FIG. 4 is a schematic diagram of a plurality of light-emitting areas in an embodiment of the present disclosure.

In an embodiment of the backlight module, as shown in FIG. 2 or FIG. 3, the backlight module further comprises a light guide plate 20 and a quantum dot layer 30. The light guide plate is provided in a light-emitting direction of the light-emitting unit (for example, a straight-down structure as shown in FIG. 2), the light-emitting unit 10 is configured to emit light in a direction of the light guide plate 20, and the quantum dot layer 30 is provided on the light guide plate 20.

Specifically, the light-emitting unit 10 may be a blue LED, and the quantum dot layer 30 comprises red quantum dots and green quantum dots. The blue light emitted by the blue LED irradiates the light guide plate 20 and is emitted upward via the light guide plate 20. Part of the light can be emitted out of the backlight module, and the other part of the light can be emitted to the red quantum dots and the green quantum dots on the quantum dot layer 30. The red quantum dots are excited to emit red light when illuminated by the blue light emitted by the blue LED, and the green quantum dots are excited to emit green light when illuminated by the blue light emitted by the blue LED. As a result, the backlight module can emit red, green, and blue light to achieve display of various colors.

In an embodiment of the backlight module, as shown in FIG. 2, the light-emitting unit 10 is disposed below the light guide plate 20, that is, the backlight module has a straight-down structure. Alternatively, as shown in FIG. 3, the light-emitting unit 10 is disposed on a side of the light guide plate 20, that is, the backlight module has a side-entry structure.

In an embodiment of the backlight module, the backlight module further comprises a reflective layer 40 disposed below the light guide plate 20.

In this embodiment, the reflective layer 40 is disposed below the light guide plate 20 which can reflect light emitted downward from the light-emitting unit 10 and the light guide plate 20 and emit the light upward, thus contributing to enhance light-emitting efficiency and light-emitting brightness of the backlight module.

In an embodiment of the backlight module, the backlight module further comprises a first shading part 51 and a second shading part 52. The first shading part 51 is disposed on a peripheral side of the light guide plate 20, and the second shading part 52 is disposed on an underside of the reflective layer 40.

According to the above configuration, the first shading part 51 and the second shading part 52 can play a shading role to prevent the light from the light-emitting unit 10 and the light guide plate 20 from emitting outward from the first shading part 51 and the second shading part 52, thereby improving light leakage.

In an embodiment of the backlight module, the first shading part 51 or the second shading part 52 abuts the light-emitting unit 10 and transfers the heat generated by the light-emitting unit 10 outward.

Specifically, the first shading part 51 abuts the light-emitting unit 10, which is suitable for a side-type backlight module. The second shading part 52 abuts the light-emitting unit 10, which is suitable for a straight-down backlight module. When the first shading part 51 and the second shading part 52 abut the light-emitting unit 10, the heat generated by the light-emitting unit 10 is transferred to the outside, which can prevent heat from accumulating in the area where the light-emitting unit 10 is located to form high temperature and contributes to protecting the light-emitting unit 10 and other structures in the area where the light-emitting unit 10 is located.

Specifically, the material of the first shading part 51 and the second shading part 52 can be selected from a material with good heat dissipation performance, such as EPP material (polypropylene plastic foam material), so that the heat generated by the light-emitting unit can be transferred to a frame and a back plate of the backlight module, and transferred effectively to the outside through the back plate and frame, thereby improving the heat dissipation effect of the backlight module. The EPP material also has good elasticity and support performance. The first shading part 51 and the second shading part 52 prepared with the EPP material can have a good anti-knock and energy-absorbing effect and good support performance, thereby protecting the backlight module.

In summary, in the backlight module provided by the above embodiments of the present disclosure, the driver chip outputs an initial current to the light-emitting unit in the light-emitting area during the first period t1 when the nth frame image is displayed, and during the first period t1, a second current is generated according to the initial current and the actual current. Then, during the second period t2, the driver chip 12 outputs the second current to the light-emitting unit in the light-emitting area. After loss in the transmission process, the second current can ensure the current value actually supplied to the light-emitting unit is equal to the initial current. Ideally, the light-emitting brightness of the light-emitting unit in the light-emitting area at this time should meet the standards and expectations, which means the actual brightness of the light-emitting area reaches the target brightness. However, in practice, due to abnormalities that will inevitably occur in the actual preparation process of the relevant devices in the backlight module, and abnormalities such as possibly damage or dim light-emitting brightness of some light-emitting units in the light-emitting area during the working process, even if the actual current supplied to the light-emitting unit is equal to the initial current, the actual brightness of the light-emitting area is still difficult to reach the target brightness in some cases. Therefore, during the second period t2, a third current is generated according to the actual brightness and the target brightness of the light-emitting area, afterwards, during the third period t3, the driver chip outputs the third current to the light-emitting unit in the light-emitting area. A difference between the third current and the second current is configured to compensate for the difference between the actual brightness of the light-emitting area and the target brightness, so as to ensure that the actual brightness of the light-emitting area is equal to the target brightness. For example, when the actual brightness of the light-emitting area is less than the target brightness, the third current generated will be greater than the second current, and the brightness difference thereof will be positive. In this way, during the third period t3, after the third current is supplied to the light-emitting unit, the light-emitting brightness of the light-emitting unit will increase, thereby increasing the actual brightness of the light-emitting area. When the above brightness difference and the third current are reasonably determined, the actual brightness of the light-emitting area will be equal to the target brightness. When the actual brightness of the light-emitting area is greater than the target brightness, the generated third current will be lower than the second current, and the brightness difference thereof will be negative. In this way, during the third period t3, after the third current is supplied to the light-emitting unit, the light-emitting brightness of the light-emitting unit will decrease, thereby decreasing the actual brightness of the light-emitting area. When the above brightness difference and the third current are reasonably determined, the actual brightness of the light-emitting area will be equal to the target brightness. Thus, during the third period t3, it is possible to avoid the situation where the actual brightness of the light-emitting area does not reach the target brightness due to reasons such as the backlight module itself or losses during operation, and the deviation in the display brightness can be improved during display.

Figure 5:
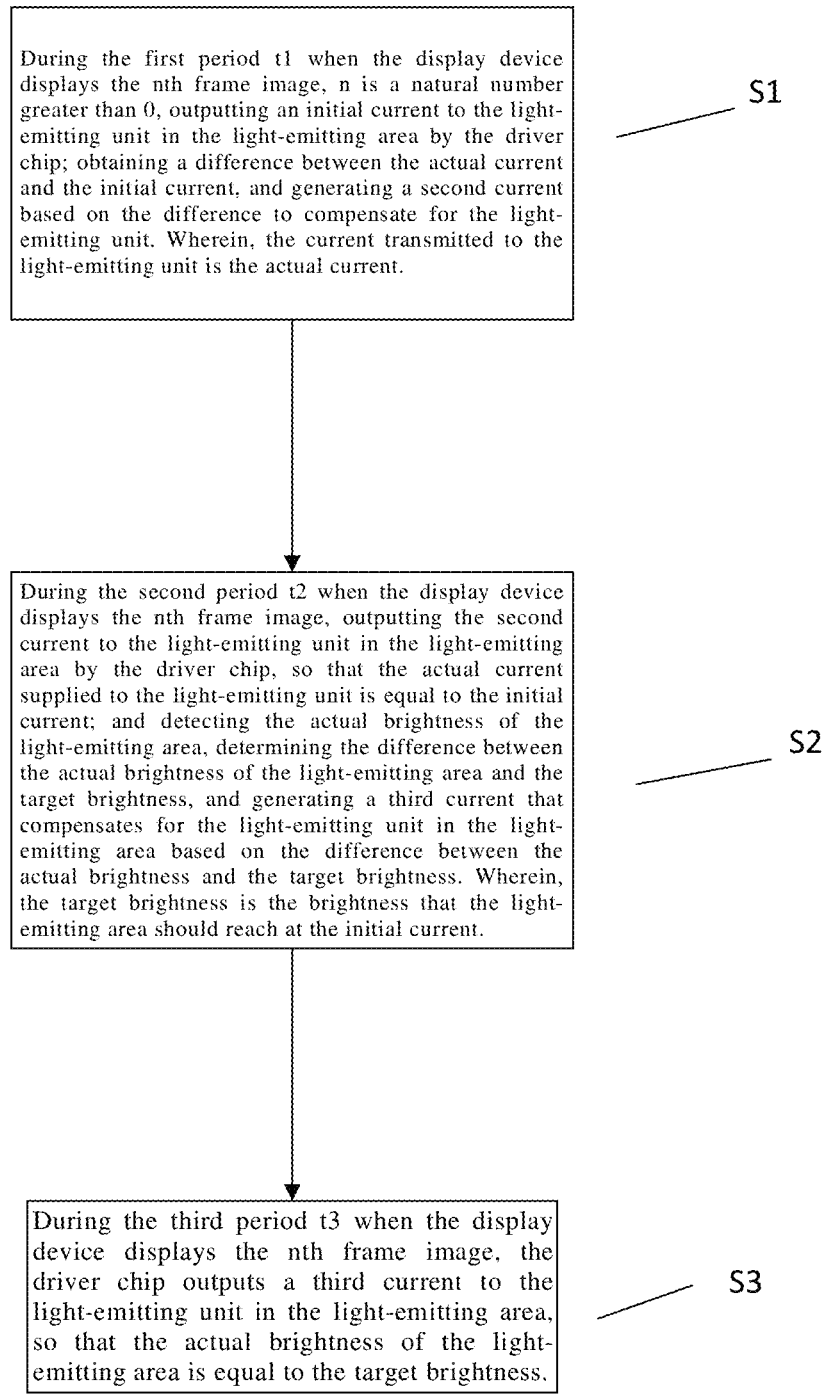
FIG. 5 is a schematic flow chart of a driving method of a backlight module in an embodiment of the present disclosure.

In an embodiment of the driving method of the backlight module of the present disclosure, the backlight module comprises a plurality of light-emitting areas, each of which is provided with one or more light-emitting units; as shown in FIG. 5, the driving method of the backlight module comprises the following steps S1 to S7.

Step S1: During the first period t1 when the display device displays the nth frame image, n is a natural number greater than 0, outputting an initial current to the light-emitting unit in the light-emitting area by the driver chip; obtaining a difference between the actual current and the initial current, and generating a second current based on the difference to compensate for the light-emitting unit. Wherein, the current transmitted to the light-emitting unit is the actual current.

In step S1, the driver chip outputs an initial current to the light-emitting units in each of the light-emitting areas, which causes a plurality of the light-emitting areas to independently have different light-emitting brightness, so that the light-emitting brightness of different light-emitting areas can correspond to the area image corresponding to the nth frame image.

The initial current of the light-emitting units in each of the light-emitting areas is generally determined by a controller (control IC or control chip) based on the brightness of the area image corresponding to the light-emitting area in the nth frame image before the display device displays the nth frame image, and is generally determined by the highest brightness in the area image. After the controller determines a value of the initial current, the driver chip outputs the initial current to the corresponding light-emitting unit specifically.

Taking a single light-emitting area as an object of discussion, there are electrical connection lines and corresponding electrical components between each of the light-emitting units in the light-emitting area and the driver chip. There will be losses during a process when the initial current is transmitted from the driver chip to the light-emitting unit. Therefore, the current actually supplied to the light-emitting unit (i.e., the actual current) will be lower than the current output from the driver chip (i.e., the initial current).

In this step, a current sampling module can be provided between the driver chip and the light-emitting unit to obtain the initial current and the actual current; the difference thereof can be determined based on the initial current and the actual current. The difference between the initial current and the actual current can be calculated by the controller (control IC or control chip).

In this step, the second current is configured to compensate for and correct the difference between the actual current and the initial current during the first period t1, so that the actual current, that is, the current actually supplied to the light-emitting unit reaches the initial current.

In this embodiment, the second current can be obtained by the following method:

Collecting a current in an output port of the driver chip as the initial current, and collecting a current in an input port of the light-emitting unit as the actual current;

Subtracting the initial current from the actual current to obtain a first compensation current, and adding the initial current and the first compensation current to obtain the second current.

In other words, when the second current is determined, the difference between the actual current and the initial current can be superimposed on the initial current, that is:

Second current=initial current+(initial current−actual current).

For example, when the initial current is 1 and the difference between the initial current and the actual current is 0.2, the second current can be determined as 1.2.

Of course, the above is only an example. In practice, the second current is not necessarily equivalent to the sum of the difference between the initial current and the actual current and the initial current, the second current can also be determined based on other various mathematic relationships or empirical data relationships.

In this step, the second current may be specifically generated by a controller (control IC or control chip). After the second current is generated, the controller controls the driver chip to output the second current during the second period t2 by, for example, transmitting an instruction signal to the driver chip.

Step S2: During the second period t2 when the display device displays the nth frame image, outputting the second current to the light-emitting unit in the light-emitting area by the driver chip, so that the actual current supplied to the light-emitting unit is equal to the initial current; and detecting the actual brightness of the light-emitting area, determining the difference between the actual brightness of the light-emitting area and the target brightness, and generating a third current that compensates for the light-emitting unit in the light-emitting area based on the difference between the actual brightness and the target brightness. Wherein, the target brightness is the brightness that the light-emitting area should reach at the initial current.

In this step S2, when the driver chip outputs the second current to the corresponding light-emitting unit, after loss the electric connection lines and related electrical components between the driver chip and the light-emitting unit, the current value actually supplied to the light-emitting unit can reach the initial current.

In an ideal situation, after step S2, the actual light-emitting brightness of the light-emitting area where the light-emitting unit is located should reach the target brightness which is the brightness that the light-emitting area should reach at the initial current (that is, the brightness of the corresponding area image in the nth frame image of the light-emitting area) apparently. However, in practice, due to some abnormal factors of the light-emitting unit itself or other situations in the backlight module (for example, the particle size of some quantum dots in above embodiments of the backlight module does not meet the standards), there may be a deviation between the actual brightness of the light-emitting area and the target brightness. Therefore, in a situation where the actual brightness of the light-emitting area does not reach the target brightness, it is necessary to further compensate for and correct the current output by the driver chip to the light-emitting unit, so that the actual brightness of the light-emitting area can truly reach the target brightness. Therefore, the actual brightness of the light-emitting area is detected and a third current is generated in step S2.

When the actual brightness of the light-emitting area is detected, the actual brightness of the light-emitting area can be detected via a photoresistor provided in each light-emitting area. A resistance value of the photoresistor responds to the brightness of the light the photoresistor receives and has a correspondence to the brightness, and thus the actual brightness of the light-emitting area can be determined based on the resistance value of the photoresistor. Of course, in practice, other methods can also be used to determine the actual brightness of each light-emitting area and determine whether the actual brightness reaches the target brightness.

In this step, specifically, a value of the third current may be generated by the controller (control IC or control chip). After the controller generates the value of the third current, the driver chip outputs the third current to the light-emitting unit. Specifically, the value of the third current may be greater than the value of the second current, or may be less than the value of the second current. This is different from the relationship between the second current and the initial current. The value of the second current is generally greater than the initial current and cannot be less than the initial current.

The third current can be obtained specifically according to the following method: obtaining the actual brightness of the light-emitting area, obtaining an actual brightness current value corresponding to the actual brightness according to a brightness-current curve, and obtaining the initial current value corresponding to the target brightness, obtaining a second compensation current value by subtracting the initial current value from the actual brightness current value, and obtaining a third current by adding the second current and the second compensation current value.

Figure 7:
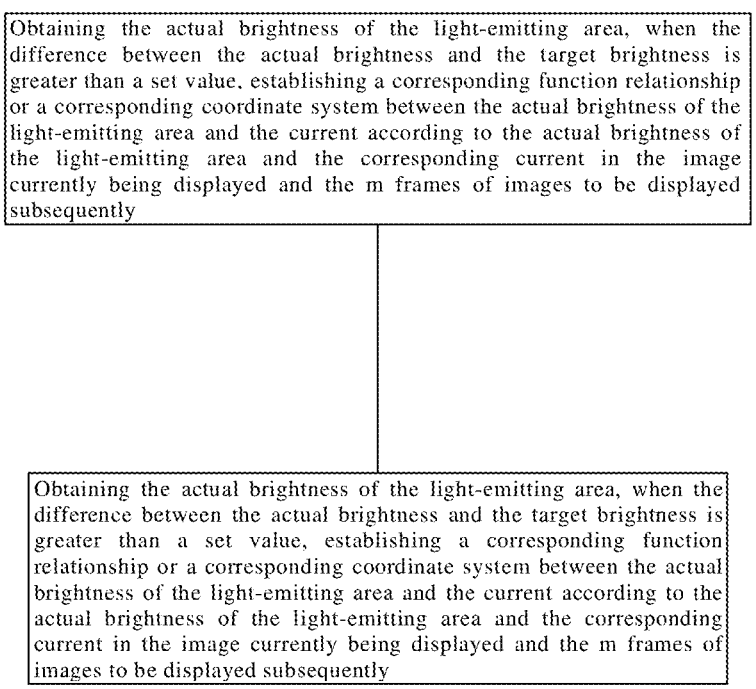
FIG. 7 is a schematic flow chart of step S2 in the driving method of a backlight module in an embodiment of the present disclosure.

Of course, in addition, the third current may also be determined according to the following steps S21 to S22, as shown in FIG. 7.

Step S21: Obtaining the actual brightness of the light-emitting area, when the difference between the actual brightness and the target brightness is greater than a set value, establishing a corresponding function relationship or a corresponding coordinate system between the actual brightness of the light-emitting area and the current according to the actual brightness of the light-emitting area and the corresponding current in the image currently being displayed and the m frames of images to be displayed subsequently; wherein m is a natural number greater than 0.

As mentioned above, due to the inevitable abnormalities in the actual preparation process of the relevant components in the backlight module, and some of the light-emitting units in the light-emitting area may be damaged or have dim brightness during the working process, even if the actual current supplied to the light-emitting unit is equal to the initial current, the actual brightness of the light-emitting area is difficult to reach the target brightness in some cases.

In the above situation, the correspondence between the actual brightness of the light-emitting area and the current is unknown. In fact, only one group of data is known: when the second current is input to the light-emitting unit in the light-emitting area, the brightness of the light-emitting area is the actual brightness detected; however, magnitude of current needed to be input to let the actual brightness of the light-emitting area reach the target brightness is unknown.

For example, for a certain light-emitting area, when a certain frame of image is displayed and the actual current is equal to the initial current and has a value of 1, the light-emitting area can achieve target brightness of 2 under normal conditions. However, during use, a certain light-emitting unit in the light-emitting area is damaged and cannot be lighted (the subsequent state is called a post-working state, and the previous state is called a pre-working state). Therefore, the actual brightness of the light-emitting area cannot reach the target brightness of 2. Upon measurement, the actual light-emitting brightness is 1. Then for the light-emitting area, in the pre-working state, a corresponding relationship between the actual current and the actual brightness is known. According to this corresponding relationship, it is only needed to set the actual current to a corresponding value to make the actual brightness of the light-emitting area reach certain target brightness. However, for the post-working state, a corresponding relationship between the actual current and the actual brightness is unknown. When the actual brightness of the light-emitting area needs to reach certain target brightness, it is not clear how much the actual current needs to be set.

Regarding the above problem, in step S21, plural groups of data are actually obtained from the current frame of image being displayed and m frames of images to be displayed thereafter, and a mathematical relationship between the actual brightness of the light-emitting area and the current is established based on the plural groups of data.

For example, taking m=3 as an example, the above process may be:

When the current frame is displayed, the actual current is equal to the initial current with a current value of 1. The actual brightness of the light-emitting area is detected to be 1, which does not reach the target brightness of 2. Therefore, it can be determined that an abnormality occurs in the light-emitting area, for example, a certain light-emitting unit within the light-emitting area may be damaged and cannot be lighted. At this time, the above process is started from the current frame. When a subsequent first frame (a first frame among m frames) of image is displayed, the actual current is, for example, 2, and the actual bright ness of the light-emitting area is detected to be 2, which does not reach target brightness of 4; when a subsequent second frame (a second frame among m frames) of image is displayed, the actual current is, for example, 1.5, and the actual brightness of the light-emitting area is detected to be 1.5, which does not reach target brightness of 3; when a subsequent third frame (a third frame among m frames) of image is displayed, the actual current is, for example, 0.5, and the actual brightness of the light-emitting area is detected to be 0.5, which does not reach the target brightness of 1.

After the above four frames of images, four groups of data of the actual brightness and actual current of the light-emitting area are obtained. Based on the four groups of data, the following formula can be obtained:

$$y=x$$

Wherein, y is the actual brightness of the light-emitting area, and x is the actual current.

The above formula is applied to the post-working state after m frames. The specific application process is, for example: when a subsequent fourth frame (the first frame after m frames) image is displayed, if target brightness to be reached by the light-emitting area is 6, according to the above formula between the actual brightness and the actual current of the light-emitting area, y=6 is brought in, x=6 can be obtained. When the subsequent fourth frame image is displayed, the actual current (specifically, a third current identical to the calculated actual current generated during the third period t3) is compensated for and corrected to 6 according to the above result, thereby ensuring that the actual brightness of the light-emitting area reaches the target brightness.

Step S22, when an image after m frames of images is displayed, in the second period t2, a corresponding current value is searched according to the target brightness in the established corresponding functional relationship or corresponding coordinate system; and in the third period t3, the third current is output to the light-emitting unit in the light-emitting area by the driver chip, the output third current being equal to the searched current value.

In this step S22, according to the established mathematical relationship between the actual brightness of the light-emitting area and the current, in a case where the target brightness to be reached by the light-emitting area is known, a value of the current that needs to be output to the light-emitting unit in the light-emitting area to reach the target brightness can be obtained, that is, the third current.

In a further embodiment, in the above step S21, in the third period t3 of the image currently being displayed and the m frames of images to be displayed thereafter, the third current output by the driver chip to the light-emitting unit in the light-emitting area is equal to the second current, or the third current has a current value greater than the second current determined according to the setting rules. Besides, the actual brightness and current of the light-emitting area configured to establish the corresponding functional relationship or the corresponding coordinate system include: the actual brightness and the corresponding second current of the light-emitting area in the second period t2 of the image currently being displayed and the m frames of images to be displayed thereafter, as well as the actual brightness of the light-emitting area and the corresponding third current in the third period t3 of the image currently being displayed and the m frames of images to be displayed thereafter.

In this embodiment, during specific implementation, the latter solution can be preferably adopted. In this case, when each frame of images is displayed, the third current is different from the second current. That is, when one frame of image is displayed, two groups of data regarding the actual brightness of the light-emitting area and the corresponding current can be obtained. In this way, sufficient data can be obtained when fewer frames of images are displayed, and the mathematical relationship between the actual brightness of the light-emitting area and the corresponding current can be established more quickly.

In this step, if the actual brightness of the light-emitting area reaches the target brightness, in the subsequent third period t3, the current output by the driver chip to each of the light-emitting units in the light-emitting area does not change and remains as the second current. On the contrary, if there is a difference between the actual brightness and the target brightness of the light-emitting area (or the difference exceeds a certain threshold), it is necessary to continue performing subsequent step S3.

Step S3: During the third period t3 when the display device displays the nth frame image, the driver chip outputs a third current to the light-emitting unit in the light-emitting area, so that the actual brightness of the light-emitting area is equal to the target brightness.

In this step S3, in a case where the driver chip outputs the third current to the light-emitting unit in the light-emitting area, the third current can avoid the difference between the actual brightness and the target brightness of the light-emitting area caused by defects of the light-emitting unit itself or other defects of the backlight module, so that the actual brightness in the third period t3 when the nth frame image is displayed in the light-emitting area can reach the target brightness.

In the driving method of the backlight module of this embodiment, during the first period t1 when the nth frame image is displayed, the driver chip outputs an initial current to the light-emitting unit in the light-emitting area, and during the first period t1, a second current is generated according to the initial current and the actual current; then, during the second period t2, the driver chip outputs a second current to the light-emitting unit in the light-emitting area, after loss in the transmission process, the second current can ensure that the actual current supplied to the light-emitting unit is equal to the initial current. Ideally, the light-emitting brightness of the light-emitting units in the light-emitting area at this time should meet the standards and expectations, so that the actual brightness of the light-emitting area can reach the target brightness. However, in practice, due to abnormalities that will inevitably occur in an actual preparation process of the relevant devices in the backlight module, and abnormalities such as possibly damage or low light-emitting brightness of some light-emitting units in the light-emitting area during the working process, even if the actual current supplied to the light-emitting unit is equal to the initial current, the actual brightness of the light-emitting area is still difficult to reach the target brightness in some cases. Therefore, during the second period t2, a third current is generated according to the actual brightness and the target brightness of the light-emitting area. Thereafter, during the third period t3, the driver chip outputs the third current to the light-emitting unit in the light-emitting area. The current difference between the third current and the second current is configured to compensate for the difference between the actual brightness and the target brightness of the light-emitting area, so as to ensure that the actual brightness of the light-emitting area is equal to the target brightness. For example, when the actual brightness of the light-emitting area is less than the target brightness, the third current generated will be greater than the second current, and the brightness difference therebetween will be positive. In this way, during the third period t3, after the third current is supplied to the light-emitting unit, the light-emitting brightness of the light-emitting unit will increase, thereby increasing the actual brightness of the light-emitting area. When the above brightness difference and the third current are reasonably determined, the actual brightness of the light-emitting area is equal to the target brightness. When the actual brightness of the light-emitting area is greater than the target brightness, the generated third current will be lower than the second current, and the brightness difference therebetween will be negative. In this way, during the third period t3, after the third current is supplied to the light-emitting unit, the light-emitting brightness of the light-emitting unit will decrease, thereby decreasing the actual brightness of the light-emitting area. When the above brightness difference and the third current are reasonably determined, the actual brightness of the light-emitting area will be equal to the target brightness. Thus, during the third period t3, it is possible to avoid the situation where the actual brightness of the light-emitting area does not reach the target brightness due to a reasons such as the backlight module itself or loss in the working process, and to improve deviation in the display brightness during display.

Two consecutive frames of images are displayed generally in a mode of blanking and then displaying, that is, there will be a reseat period before charging and officially displaying the next frame of image. In this embodiment, the first period t1 may exist in the reset period, and the second period t2 and the third period t3 may exist in a period when the next frame of image is officially displayed.

Figure 6:
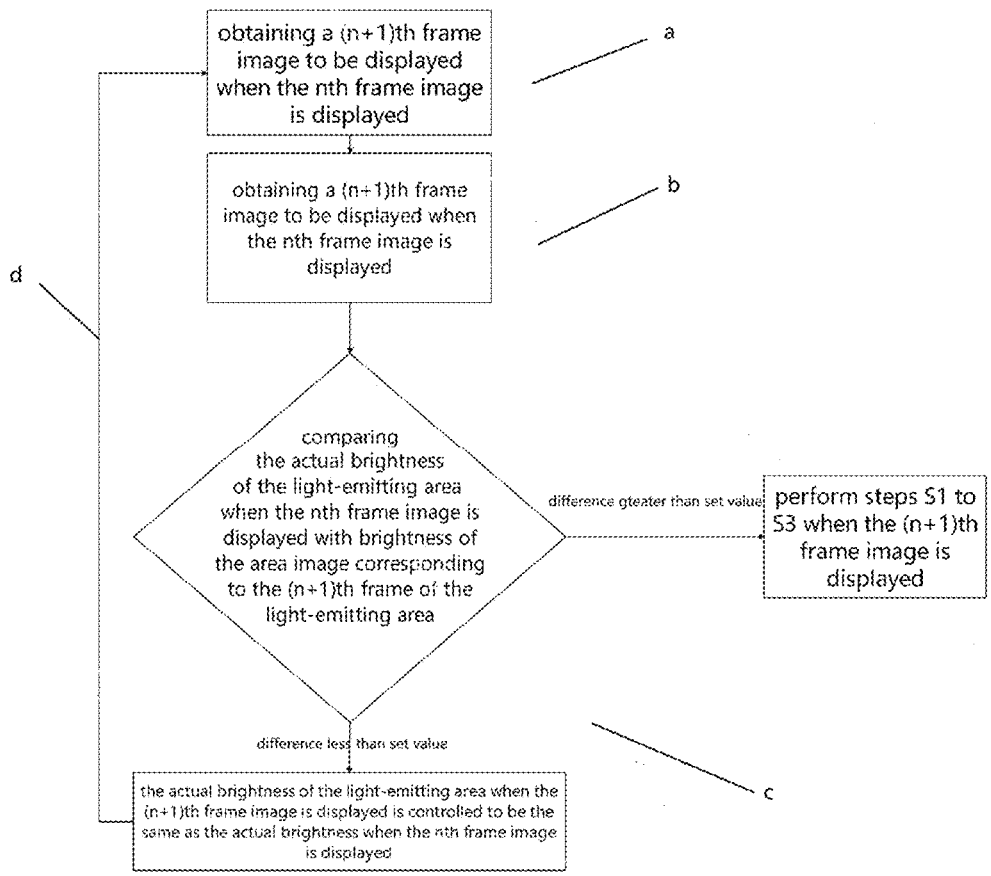
FIG. 6 is a schematic flow chart of a driving method of a backlight module in another embodiment of the present disclosure.

In an embodiment of the driving method of the backlight module, as shown in FIG. 6, the driving method of the backlight module comprises the following steps a to d.

Step a: obtaining a (n+1)th frame image to be displayed when the nth frame image is displayed.

Step b: obtaining an area image corresponding to the light-emitting area in the (n+1)th frame image to be displayed.

Step c: comparing the actual brightness of the light-emitting area when the nth frame image is displayed with brightness of the area image corresponding to the (n+1)th frame of the light-emitting area. If a difference therebetween is less than a set value, when the (n+1)th frame image is displayed, the actual brightness of the light-emitting area when the (n+1)th frame image is displayed is controlled to be the same as the actual brightness when the nth frame image is displayed.

Step d: repeating the above steps, until in two adjacent frames of images, the difference between the actual brightness of the light-emitting area when the previous frame image is displayed and the brightness of the area image of the light-emitting area in the next frame is greater than the set value.

In this embodiment, according to the above steps a to c, when the (n+1)th frame image is displayed, since the brightness difference between the corresponding area image in the (n+1)th frame image (that is, the actual brightness of the light-emitting area in the third period t3 when the nth frame image is displayed) and the corresponding area image in the nth frame image of the same light-emitting area is small, when the (n+1)th frame image is displayed, the current output by the driver chip to the light-emitting unit in the light-emitting area when the nth frame image is displayed is directly used when the (n+1)th frame image is displayed, without continuously adjusting the current output by the driver chip to the light-emitting unit or significantly affecting the actual display effect.

According to the above step d, if one or more frames of images following the (n+1)th frame image also have a situation similar to the (n+1)th frame, when a plurality of consecutive frames of images starting from the (n+1)th frame are displayed, there is no need to adjust the current output by the driver chip to the light-emitting unit of the light-emitting area.

In an embodiment of the display device of the present disclosure, the display device comprises the backlight module described in the above embodiments, and a display panel disposed in a light-exit direction of the backlight module.

The display device in the embodiment of the present disclosure comprises the above backlight module, and of course has the same beneficial effects as the above backlight module, which will not be described again.

It should be noted that herein, relationship terms such as "first" and "second" are only configured to distinguish one entity or operation from another entity or operation, and do not necessarily require or imply such actual relationship or sequence between entities or operations. Furthermore, the terms "comprises," "comprising," or any other variations thereof are intended to cover a non-exclusive inclusion such that a process, method, article, or apparatus that comprises a list of elements comprises not only those elements, but also those not expressly listed other elements, or elements inherent to the process, method, article or equipment. Without further limitation, an element defined by the statement "comprises a . . . " does not exclude the presence of additional identical elements in a process, method, article, or apparatus that comprises the stated element.

The above description is only specific embodiments of the present disclosure, enabling those skilled in the art to understand or implement the present disclosure. Various modifications to these embodiments will be readily apparent to those skilled in the art, and the generic principles defined herein may be practiced in other embodiments without departing from the spirit or scope of the disclosure. Thus, the present disclosure is not intended to be limited to the embodiments shown herein but is to be accorded the widest scope consistent with the principles and novel features claimed herein.

What is claimed is:

1. A driving method of a backlight module comprising a plurality of light-emitting areas, each of which is provided with one or more light-emitting units, wherein the driving method of the backlight module comprises:

In a first period t1 when a display device displays a nth frame image, outputting an initial current to the light-emitting unit in the light-emitting area by a driver chip; and obtaining a difference between an actual current and the initial current, and generating a second current to compensate for the light-emitting unit based on the difference between the actual current and the initial current, wherein n is a natural number greater than 0, and the actual current is a current at which the initial current is transmitted to the light-emitting unit;

In a second period t2 when the display device displays the nth frame image, outputting a second current to the light-emitting unit in the light-emitting area by the driver chip, so that the actual current supplied to the light-emitting unit is equal to the initial current; and detecting actual brightness of the light-emitting area, determining a difference between the actual brightness and target brightness of the light-emitting area, and generating a third current to compensate for the light-emitting unit in the light-emitting area based on the difference between the actual brightness and the target brightness, wherein the target brightness is brightness that the light-emitting area reaches at the initial current; and in a third period t3 when the display device displays the nth frame image, outputting the third current to the light-emitting unit in the light-emitting area by the driver chip, so that the actual brightness of the light-emitting area is equal to the target brightness.

2. The driving method of the backlight module of claim 1, wherein obtaining a difference between an actual current and the initial current, and generating a second current to compensate for the light-emitting unit based on the difference between the actual current and the initial current comprises:

collecting a current at an output port of the driver chip as the initial current, and collecting a current at an input port of the light emitting unit as the actual current; and subtracting the actual current from the initial current to obtain a first compensation current value and adding the initial current and the first compensation current value to obtain the second current.

3. The driving method of the backlight module of claim 1, wherein detecting actual brightness of the light-emitting area, and generating a third current to compensate for the light-emitting unit in the light-emitting area based on the actual brightness and the target brightness comprises:

obtaining the actual brightness of the light-emitting area;

Obtaining an actual brightness current value corresponding to the actual brightness according to a brightness-current curve;

Obtaining an initial current value corresponding to the target brightness;

subtracting the actual brightness current value from the initial current value to obtain a second compensation current value; and adding the second current and the second compensation current value to obtain the third current.

4. The driving method of the backlight module of claim 1, further comprising:

obtaining a (n+1)th frame image to be displayed when the nth frame image is displayed;

obtaining an area image corresponding to the light-emitting area in the (n+1)th frame image to be displayed;

comparing actual brightness of the light-emitting area when the nth frame image is displayed with brightness of the light-emitting area when the (n+1)th frame image is displayed, if a difference therebetween is less than a set value, controlling the actual brightness of the light-emitting area when the (n+1)th frame image is displayed to be the same as the actual brightness of the light-emitting area when the nth frame image is displayed; and repeating the above steps until a difference between actual brightness of the light-emitting area when a previous frame image is displayed and brightness of the light-emitting area when a subsequent frame image is displayed is greater than a set value in two adjacent frames of images.

5. The driving method of the backlight module of claim 1, detecting actual brightness of the light-emitting area, and generating a third current to compensate for the light-emitting unit in the light-emitting area based on the actual brightness and the target brightness comprises:

Obtaining the actual brightness of the light-emitting area, when the difference between the actual brightness and the target brightness is greater than a set value, establishing a corresponding functional relationship or a corresponding coordinate system between the actual brightness of the light-emitting area and a current corresponding thereto according to the actual brightness of the light-emitting area and the corresponding current in an image being currently displayed and m frames of images to be displayed thereafter;

searching a corresponding current value according to the target brightness in the established corresponding functional relationship or corresponding coordinate system when an image after the m frames of images is displayed in the second period t2, wherein m is a natural number greater than 0;

Outputting the third current to the light-emitting unit in the light-emitting area by the driver chip in the third period t3, the output third current being equal to the searched current value.

6. The driving method of the backlight module of claim 5, wherein the actual brightness of the light-emitting area and the current configured to establish the corresponding functional relationship or the corresponding coordinate system comprise:

The actual brightness of the light-emitting area and the corresponding second current in the second period t2 of an image currently being displayed and the m frames of images to be displayed thereafter, and the actual brightness of the light-emitting area and the corresponding third current in the third period t3 of the image currently being displayed and the m frames of images to be displayed thereafter.

7. The driving method of the backlight module of claim 5, wherein establishing a corresponding functional relationship or a corresponding coordinate system between the actual brightness of the light-emitting area and a current corresponding thereto comprises:

In the third period t3 of the image currently being displayed and the m frames of images to be displayed thereafter, the third current output by the driver chip to the light-emitting unit in the light-emitting area is equal to the second current.

8. The driving method of the backlight module of claim 7, wherein the actual brightness of the light-emitting area and the current configured to establish the corresponding functional relationship or the corresponding coordinate system comprise:

the actual brightness of the light-emitting area and the corresponding second current in the second period t2 of an image currently being displayed and the m frames of images to be displayed thereafter, and the actual brightness of the light-emitting area and the corresponding third current in the third period t3 of the image currently being displayed and the m frames of images to be displayed thereafter.

9. The driving method of the backlight module of claim 5, wherein establishing a corresponding functional relationship or a corresponding coordinate system between the actual brightness of the light-emitting area and a current corresponding thereto comprises:

the third current has a current value greater than that of the second current determined according to set rules in the third period t3 of the image currently being displayed and the m frames of images to be displayed thereafter.

10. The driving method of the backlight module of claim 9, wherein the actual brightness of the light-emitting area and the current configured to establish the corresponding functional relationship or the corresponding coordinate system comprise:

the actual brightness of the light-emitting area and the corresponding second current in the second period t2 of the image currently being displayed and the m frames of images to be displayed thereafter, and the actual brightness of the light-emitting area and the corresponding third current in the third period t3 of the image currently being displayed and the m frames of images to be displayed thereafter.

11. A backlight module comprising a plurality of independent light-emitting areas, each of which is provided with at least one light-emitting unit corresponding thereto; a current sampling module; a brightness detection module; a driver chip; and a controller, wherein The driver chip is configured to output an initial current, a second current and a third current to each of the light emitting units respectively in a first period t1, a second period t2 and a third period t3 when each frame of image is displayed;

The current sampling module is arranged between the driver chip and each of the light emitting units, and is configured to collect the initial current and an actual current when the driver chip outputs the initial current to each of the light emitting units, the initial current being a current output by the driver chip, the actual current being a current actually supplied to the light-emitting unit;

The brightness detection module is configured to detect actual brightness of the light-emitting area;

The controller is configured to determine a value of the second current to each of the light emitting units based on the initial current and the actual current; and to generate the third current to the light emitting unit in the light-emitting area according to the actual brightness and target brightness of each of the light-emitting areas in the second period t2, wherein the target brightness is brightness that each of the light-emitting areas should reach at the initial current.

12. The backlight module of claim 11, wherein the light-emitting detection module comprises a photoresistor arranged in each of the light-emitting areas.

13. The backlight module of claim 12, wherein each of the light-emitting areas is provided with a plurality of photoresistors arranged at intervals within the light-emitting area.

14. The backlight module of claim 11, wherein a plurality of the light-emitting areas are divided into a plurality of rows and/or a plurality of columns; a shape of a plurality of the light-emitting areas comprise one or more of polygons, circles and ellipses.

15. The backlight module of claim 11, further comprising a light guide plate, a quantum dot layer, a reflective layer, a first shading part and a second shading part; wherein The light emitting unit is configured to emit light to a direction of the light guide plate, and the quantum dot layer is arranged above the light guide plate; the reflective layer is arranged below the light guide plate;

The first shading part is arranged on a peripheral side of the light guide plate, and the second shading part is arranged on a lower side of the reflective layer; the first shading part or the second shading part abuts the light-emitting unit, and heat generated by the light-emitting unit is transferred outward; material of the first shading part and the second shading part is EPP material.

16. A display device comprising the backlight module of claim 11 and a display panel arranged in a light-exit direction of the backlight module.

* * * * *